United States Patent [19]

Goldstein et al.

[11] 4,061,597

[45] Dec. 6, 1977

[54] NO$_x$ CONTROL IN CATALYST MANUFACTURE

[75] Inventors: Marvin Sherwood Goldstein, Norwalk; John Francis Lindsley, Stamford, both of Conn.; William Woodrow Allison; Charles Dan Price, both of Fort Worth, Tex.

[73] Assignee: American Cyanamid Company, Stamford, Conn.

[21] Appl. No.: 637,570

[22] Filed: Dec. 4, 1975

[51] Int. Cl.$^2$ .................. B01J 23/16; B01J 21/04; B01J 23/84; C01B 21/00

[52] U.S. Cl. ............................ 252/465; 252/461; 252/470; 423/235; 423/239; 423/351

[58] Field of Search ............... 423/235, 239, 351; 252/461, 465, 470

[56] References Cited

U.S. PATENT DOCUMENTS

| | | | |
|---|---|---|---|
| 3,565,575 | 2/1971 | Warshaw | 423/235 |
| 3,599,427 | 8/1971 | Jones et al. | 423/235 X |
| 3,801,696 | 4/1974 | Mark | 423/213.2 X |
| 3,826,810 | 7/1974 | Lawson | 423/212 C |
| 3,846,981 | 11/1974 | Paczkowski | 423/351 X |
| 3,853,791 | 12/1974 | Feins | 252/465 |
| 3,895,094 | 7/1975 | Carter et al. | 423/239 |
| 3,900,554 | 8/1975 | Lyon | 423/237 X |
| 3,914,390 | 10/1975 | Kudo et al. | 423/239 X |

FOREIGN PATENT DOCUMENTS

| | | | |
|---|---|---|---|
| 1,388,669 | 3/1975 | United Kingdom | 423/235 |
| 186,985 | 11/1966 | U.S.S.R. | 423/235 |

*Primary Examiner*—Patrick P. Garvin
*Assistant Examiner*—William G. Wright
*Attorney, Agent, or Firm*—William J. van Loo

[57] ABSTRACT

An improved process for suppression of oxides of nitrogen arising from heat treatment of catalyst materials containing a source of such oxides is provided which comprises separately introducing the catalyst material and urea into the heating zone and then effecting heat treatment.

10 Claims, No Drawings

NO$_x$ CONTROL IN CATALYST MANUFACTURE

This invention relates to a process for abating oxides of nitrogen that emanate upon heat treatment of the catalyst materials. More particularly, the invention relates to such a process wherein the catalyst material and urea are separately introduced into the heat treatment zone and abatement results by reaction of the oxides of nitrogen with the urea thus introduced at reactive temperature arising from such heat treatment.

A continuing concern over environmental pollution, particularly air pollution is reflected in the provisions for ever-increasingly strict limitations being enacted into law. A major source of air pollution arises from exhaust gases emanating from combustion of petroleum products such as operation of internal combustion engines, burning in conjunction with heat and power generation, and industrial processes. Considerable progress has been made in reducing air pollution by providing cleaner fuels and emission controls. A large contribution in this control of noxious emissions has been provided by the catalyst industry in the form of catalyst materials which provide cleaner fuels and convert noxious fumes to innocuous gases that are normally present in the air.

In preparing catalyst materials for these and other uses, a convenient method involves providing a porous support or carrier material upon which various activators and/or promoters are carried. In providing the support material as well as the activator and/or promoter therefor, it is often necessary to employ nitric acid or salts of nitric acid. Such usages upon subsequent heat treatment of the catalyst material gives rise to copious fumes of oxides of nitrogen which are highly noxious air pollutants, and some provision for abatement of such emissions is required.

In many applications of catalyst materials, it is desirable that they be in the form of particles of consistent specific size having a desired level of porosity. This is necessary to avoid excessive pressure drops across a catalyst bed while providing the necessary diffusion to effect the desired reaction. Accordingly, the catalyst materials prepared for use in these applications are formed into the desired particulate size and shape in conjunction with their manufacture. In the normal preparation of the particulates, a small amount of fines, or undersized particles, will develop, but the amount is within limits and does not seriously affect processing.

One method of abating the emissions of oxides of nitrogen is to pass them through specially installed scrubbers which can remove pollutants. Scrubbing equipment is generally extremely bulky and costly to install and service. Installation often is difficult to achieve in existing plants because of space limitations with the result that redesign and reconstruction of the plant may be necessary. In many instances products arising from the scrubbing operation may give rise to disposal problems and other difficulties.

An alternative method for abating emissions of oxides of nitrogen is to provide the catalyst material with a content of urea when it also contains a source of such oxides. Subsequently, when the catalyst material is heat treated to temperatures at which oxides of nitrogen are evolved, the oxides are abated by the urea contained by the catalyst material. Thus the catalyst material itself contains the reactant necessary for the abatement of the oxides of nitrogen that arise. However, because the urea is in contact with the catalyst material being heat treated, it becomes deposited within the pore volume of the particulate catalyst material. It is believed that nitric acid and nitrates decompose according to the equation $$2HNO_3 \rightarrow 2HNO_2 + O_2.$$

It is also believed that nitrous acid reacts with urea according to the equation $$2HNO_2 + H_2NCONH_2 \xrightarrow{heat} 2N_2 + CO_2 + 3H_2O.$$

Thus, at reaction temperature the two volumes of nitrous acid combine with urea to provide six volumes of gaseous products. This voluminous gas generation appears to take place rapidly and exothermically causing large pressure increases within the pore structure of the particulate catalyst material. The sudden large pressure increases within the particulate catalyst material are believed to be responsible for particle breakage and when urea is part of the content of the catalyst materials becomes excessive and intolerable.

Accordingly, there continues to exist the need for methods of abating oxides of nitrogen that arise in the production of catalyst materials and do not cause excessive fines production or other deficiencies of former methods. The provision for such a method would constitute a notable advance in the art and fulfill a long-felt need.

It is a primary object of the present invention, therefore, to provide a method of abating oxides of nitrogen that arise in the heat treatment of catalyst materials containing a source of such oxides, which method does not cause excessive production of fines when particulate catalyst materials are involved.

In accordance with the present invention, there is provided a process for abating oxides of nitrogen which arise during heat treatment of catalyst materials containing a source of said oxides, which process comprises introducing the catalyst material requiring heat treatment into a heat treatment zone, separately introducing an effective amount or urea into said heat treatment zone, and thereafter effecting heat treatment whereby oxides of nitrogen arising from said catalyst material are abated by reaction with the separately introduced urea.

In a preferred embodiment of the inventive process, the urea is deposited upon fines from prior preparations of catalyst material and such treated fines are co-mingled with the catalyst material to be heat treated and separated therefrom subsequent to heat treatment.

In a more preferred embodiment of the inventive process, the urea in the form of a mist is sprayed above the catalyst material directly onto the oxides of nitrogen that arise while avoiding contact of the urea mist with the catalyst material.

The present invention provides an effective method of abating oxides of nitrogen arising from heat treatment of catalyst materials containing a source of such oxides while avoiding deficiencies of the former methods. When the catalyst material is processed in the form of particulates, the production of fines is consistent with conventional processing, i.e. no excessive production of fines occurs. The process is readily carried out using existing installations without the need for scrubbers and the space and servicing requirements associated therewith. The process is simple to perform and readily controlled.

It is surprising that such a simple process should be so highly effective in view of the prior teachings which require elaborate scrubbers or a urea content within the catalyst material being heat treated.

In carrying out the process of the present invention, the catalyst material is prepared in accordance with conventional procedures except for the heat treatment step. The catalyst material will, of course, have a source of oxides of nitrogen as part of its composition at the time the heat treatment is to be conducted. In conducting the heat treatment, the catalyst material and urea are separately introduced into the heat treatment zone wherein a temperature sufficient to cause generation of oxides of nitrogen and to effect reaction of urea therewith. The temperature at which reaction of urea with oxides of nitrogen occurs is essentially that at which the oxides of nitrogen arise. Accordingly, if the heat treatment conditions are sufficient to generate oxides of nitrogen, they are inherently capable of effecting reaction of urea therewith. Generally the heat treatment is conducted at temperatures of 300° C. and higher and effective abatement of oxides of nitrogen occurs. Even at temperatures of about 150° C., evidences of generation of oxides of nitrogen and of abatement thereof by urea are seen.

A typical preparation of formed catalyst material is one based on spray-dried powdered alumina obtained by precipitation of sodium aluminate and aluminum sulfate. The alumina powder is mulled with water and appropriate extrusion aids to form an extrudable paste. In such mixture, nitric acid is sometimes added to modify properties of the resulting extrudates. After the extrudable paste has been obtained, it is extruded into desirable form and, if necessary, cut to the desired length. Typically, the paste is formed into cylinders of 1/16 to ¼ inch diameter and cut to a length to width ratio of from about 4:1 to 1:1. The extrudates are then subjected to heat treatment to set their structure. Heat treatment generally consists of preliminary drying at low temperature, i.e. up to about 125° C., and of subsequent calcination at temperatures of about 500° C. and higher.

In preparing the extrusion paste, as indicated, nitric acid may be present. In addition, in some instances provision may also be made for activator or promoter content in the extrusion mix. In such instances, a metal compound in the form of a nitrate salt may be used. Accordingly, the extrudates as prepared may contain one or more sources of oxides of nitrogen which require abatement during heat treatment. At low temperature drying conditions, evolution of oxides of nitrogen may not occur and abatement may, therefore, be unnecessary. However, if oxides of nitrogen do arise at the drying conditions employed, they may be abated according to the process of the invention. Usually, the oxides of nitrogen arise during high temperature heat treatments, such as calcination and it is in conjunction therewith that the process of the invention is particularly useful.

In the above discussion, it is indicated that in preparing the extrudates and setting their structure by heat treatment, the necessity of abatement of oxides of nitrogen due to incorporation of nitric acid or metal nitrate salts in the extrusion mixture may arise. It also frequently occurs that provision for activators and/or promoters is made after the extrudates have been prepared and set in structure by heat treatment. In such instances the calcined extrudates are treated with suitable activators and/or promoters, generally by impregnation of aqueous solutions of soluble compounds that upon subsequent heat treatment provide the desired activator or promoter content. In many instances one or more of the soluble compounds is a nitrate salt and will give rise to oxides of nitrogen in the subsequent heat treatment. Accordingly, the process of the present invention is applicable for abating the oxides of nitrogen that will arise upon subsequent heat treatment, generally a second calcination.

The present invention is not concerned with the preparation of a catalyst material per se but is only concerned with abatement of oxides of nitrogen that arise in conjunction with the heat treatment thereof. Accordingly, preparation of the catalyst materials will follow conventional procedures using conventional ingredients except for the provision for abatement of oxides of nitrogen as described herein.

When a catalyst material is subjected to heat treatment, such treatment may be carried out in a variety of heating devices in accordance with conventional procedures. These devices may include muffle furnaces, rotary calciners, direct-fired kilns, and other types of heating ovens that provide the necessary temperature of treatment. In any of these devices, the heat treatment takes place in what is conveniently referred to as a heating zone. The catalyst material is introduced into the heating zone and subsequently reaches the desired temperature of heat treatment during its residence therein. Provision can be readily made to introduce other materials into the heating zone along with the catalyst material.

One embodiment of the present invention involves introducing solid urea, preferably as prills into the heating zone with the catalyst material. This is effectively done by co-mingling the urea prills with the catalyst materials. As the temperature of the materials in the heating zone increase and oxides of nitrogen are generated, the urea becomes active in the abatement reaction and converts oxides of nitrogen to innocuous gases.

A preferred embodiment of the present invention is to introduce urea into the heating zone in a form in which it is carried on fines from previous catalyst preparations. The urea is impregnated upon the fines to deposit an effective amount thereon and then dried. The thus-treated fines are then co-mingled with the catalyst material to be heat treated and again effective abatement of the oxides of nitrogen is obtained. In a more preferred embodiment of the present invention, the urea is introduced into the heating zone in the form of a mist directly onto the fumes of oxides of nitrogen as they arise at a point of contact sufficiently removed from the catalyst material so that the urea is out of contact with the catalyst material. Alternatively, the urea mist may be introduced at a distance beyond the point of formation of the fumes but prior to the point where they are discharged to the atmosphere.

If the temperature of the heating zone is adequate, the urea may be introduced in the form of a mist of an aqueous solution thereof. Alternatively, the urea may be introduced as a mist of solid or molten urea to minimize lowering of the temperature. The rate of introduction of the mist should be sufficient to minimize or eliminate the brown oxides of nitrogen that are emanated. The mist may be supplied from a single source or from a battery of sources in lateral or tandem arrangement. The mist may be introduced by use of any suitable means such as a steam aspirator, an air jet, a spray nozzle, an atomizer, and such other devices that are normally used for providing a mist. It is possible to introduce the mist at a suitable point within the heat treating device itself or at a suitable point upon the exit gas stream.

As indicated in the equation above, one mole of urea is effective for 2 moles of nitrous or nitric acid. Effective reduction of oxides of nitrogen will generally be observed using from about 0.25 to 5 moles, preferably 0.5 to 4 moles of urea per mole of nitrate ion present in the catalyst material to be heat treated.

The invention is more fully illustrated in the examples which follow wherein all parts and percentages are by weight unless otherwise specified.

EXAMPLE 1

Calcined alumina extrudates formed as cylinders of 1/8 inch diameter from precipitated alumina and having a pore volume of 0.74 cc. per gram were employed as carrier. An aqueous solution in the amount of 220 cc. and containing 53.7 grams of $(NH_4)_2Mo_2O_7$ (ammonium dimolybdate), 88.5 grams of $Ni(NO_3)_2 \cdot 6H_2O$ and 26.5 grams of 86.3% $H_3PO_4$ was employed to impregnate 300 grams of carrier. Impregnation was effected by spraying using a pressurized spray gun directed on the extrudates rotating in a gallon jar. Spraying was for 5 minutes and the extrudates were rotated for an additional hour. The wet extrudates were allowed to stand overnight and then dried at 250° F. for 2 hours.

The dried extrudates were co-mingled with 36.5 grams of urea in solid crystalline form in preparation for calcination. The solid urea crystals were added to the extrudates and the mixture was rotated in a gallon jar to effect uniform co-mingling. The resulting composition was then calcined at 1200° F. for 1.5 hours, during which time no evolution of oxides of nitrogen was detected. The resulting catalyst material had a composition corresponding to 6% NiO, 12% $MoO_3$, 3.2% P and the balance alumina. Catalyst breakage was minimal.

COMPARATIVE EXAMPLE A

The procedure of Example 1 was followed in every material detail except that no provision for urea co-mingling was made. Instead the dried extrudates without urea provision were subjected directly to calcination. Copious evolution of oxides of nitrogen occured during calcination of the impregnated support.

COMPARATIVE EXAMPLE B

The procedure of Example 1 was followed except that 36.5 grams of urea were incorporated in the impregnating solution and thus urea was present within the porosity of the support. Co-mingling of the solid urea was eliminated since the urea was present within the support porosity. No evolution of oxides of nitrogen was detected during calcination of the impregnated support. However, excessive breakage of the resulting catalyst material occurred, resulting in production of fines that amounted to about three times the amount obtained in Example 1.

EXAMPLE 2

The procedure of Example 1 was again followed except that granular urea added was in the form of prills. Substantially the same results were obtained as in Example 1.

EXAMPLE 3

Fines screened from previous support preparation in the amount of 100 grams were impregnated with 74 cc. of an aqueous solution containing 36.5 grams of urea. The impregnated fines were dried at 150° C. to remove the aqueous medium.

The procedure of Example 1 was again followed except that the urea-impregnated fines were co-mingled with the dried extrudates in place of the crystalline solid urea. No evolution of oxides of nitrogen was detected during the calcination step. The fines were then separated from the catalyst material and the yield of unbroken catalyst material was improved by the use of the urea-impregnated fines.

EXAMPLE 4

The procedure of Example 3 was followed except that the impregnated support was not dried after impregnation, the urea-impregnated fines being co-mingled with the wet extrudates. Upon subsequent calcination no evolution of oxides of nitrogen was detected and breakage of catalyst material was minimal.

EXAMPLE 5

A catalyst support is prepared following conventional procedures using a precipitated alumina powder, processing the powder as an aqueous slurry in a mixmuller, using added nitric acid to increase density of the resulting support, and extruding the resulting mix. The extrudates are then heat treated to remove water therefrom and to set the support structure. This heat treatment is carried out using a conventional calciner. The exhaust gases that emanate from the calciner contain copious brown fumes of oxides of nitrogen when no provision is made for abatement of such fumes.

At a point near the discharge end of the calciner, which operates at about 1000° to 1300° F., a mist of urea in the form of a 30 weight percent aqueous solution is introduced above the extrudates being heated therein so that no contact of mist therewith occurs. The exhaust gases travel countercurrent to the flow of extrudates and discharge toward the feed end of the calciner. The mist of urea thus introduced eliminates all evidence of the typical brown fumes of oxides of nitrogen.

EXAMPLE 6

Impregnated extrudates are prepared as in Example 1. When a portion of the extrudates are calcined at 1200° F. for 1.5 hours, copious brown fumes emanate from the calciner.

When provision is made for abatement of fumes of oxides of nitrogen following the procedure of Example 5, no evidence of the typical brown fumes of oxides of nitrogen is seen. Catalyst breakage is minimal.

We claim:

1. A process for abating oxides of nitrogen which arise during heat treatment in the manufacture of catalysts containing a source of said oxides which process comprises introducing the catalyst material requiring heat treatment at a temperature of 300° C. and higher in said manufacture into a suitable heat treatment zone, separately introducing an effective amount of urea into said heat treatment zone, and thereafter effecting heat treatment at a temperature of 300° C. and higher whereby oxides of nitrogen arising from said catalyst material are abated by reaction with the separately introduced urea.

2. The process of claim 1 wherein said urea is introduced in the form of a mist.

3. The process of claim 1 wherein said urea is introduced in solid form.

4. The process of claim 2 wherein said mist is an aqueous solution.

5. The process of claim 2 wherein said mist is pulverized solid urea.

6. The process of claim 3 wherein said urea is in prill form.

7. The process of claim 3 wherein said urea is carried on catalyst fines.

8. The process of claim 1 wherein said heat treatment is calcination.

9. The process of claim 1 wherein said catalyst material is one based on an alumina support.

10. The process of claim 1 wherein said catalyst material is one based on an alumina support and contains molybdenum and nickel activators.

* * * * *